July 31, 1962 — D. D. MACKINTOSH — 3,046,804
POWER TRANSMISSION MECHANISM
Filed Aug. 24, 1959 — 2 Sheets-Sheet 2
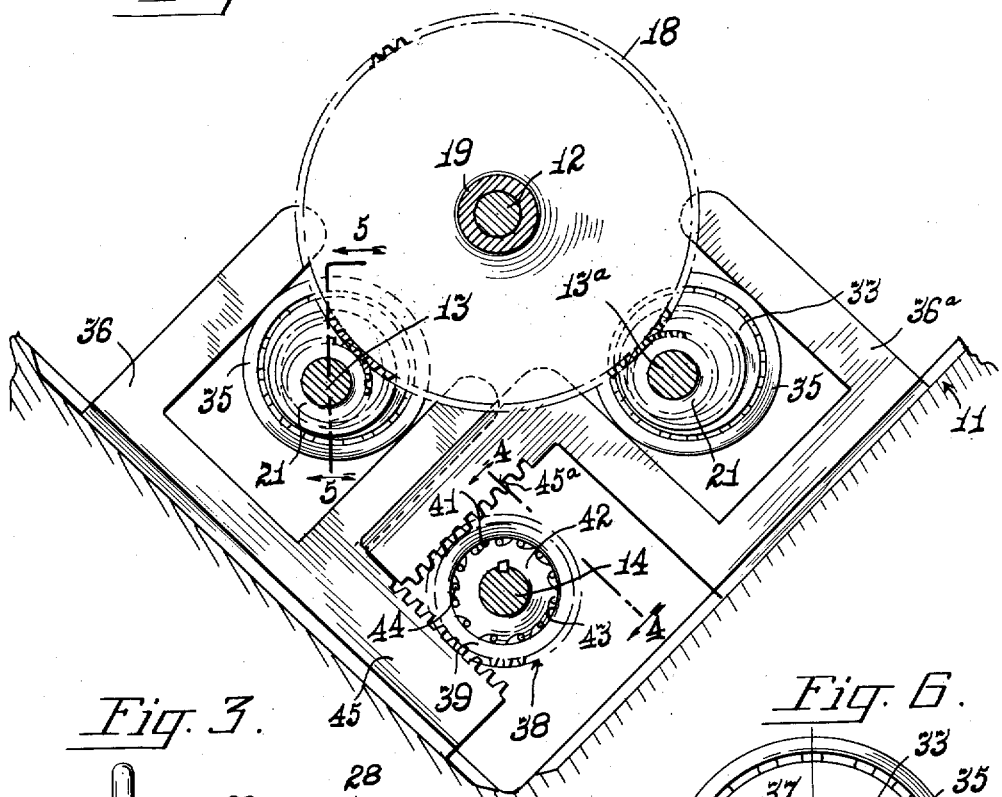
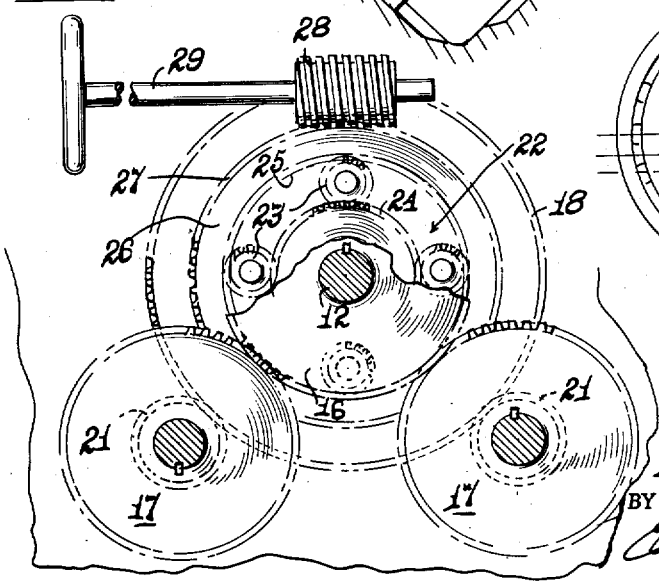
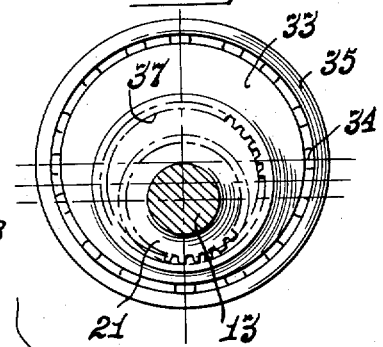
INVENTOR.
Donald D. Mackintosh
BY
Elmer L. Quickel
Atty.

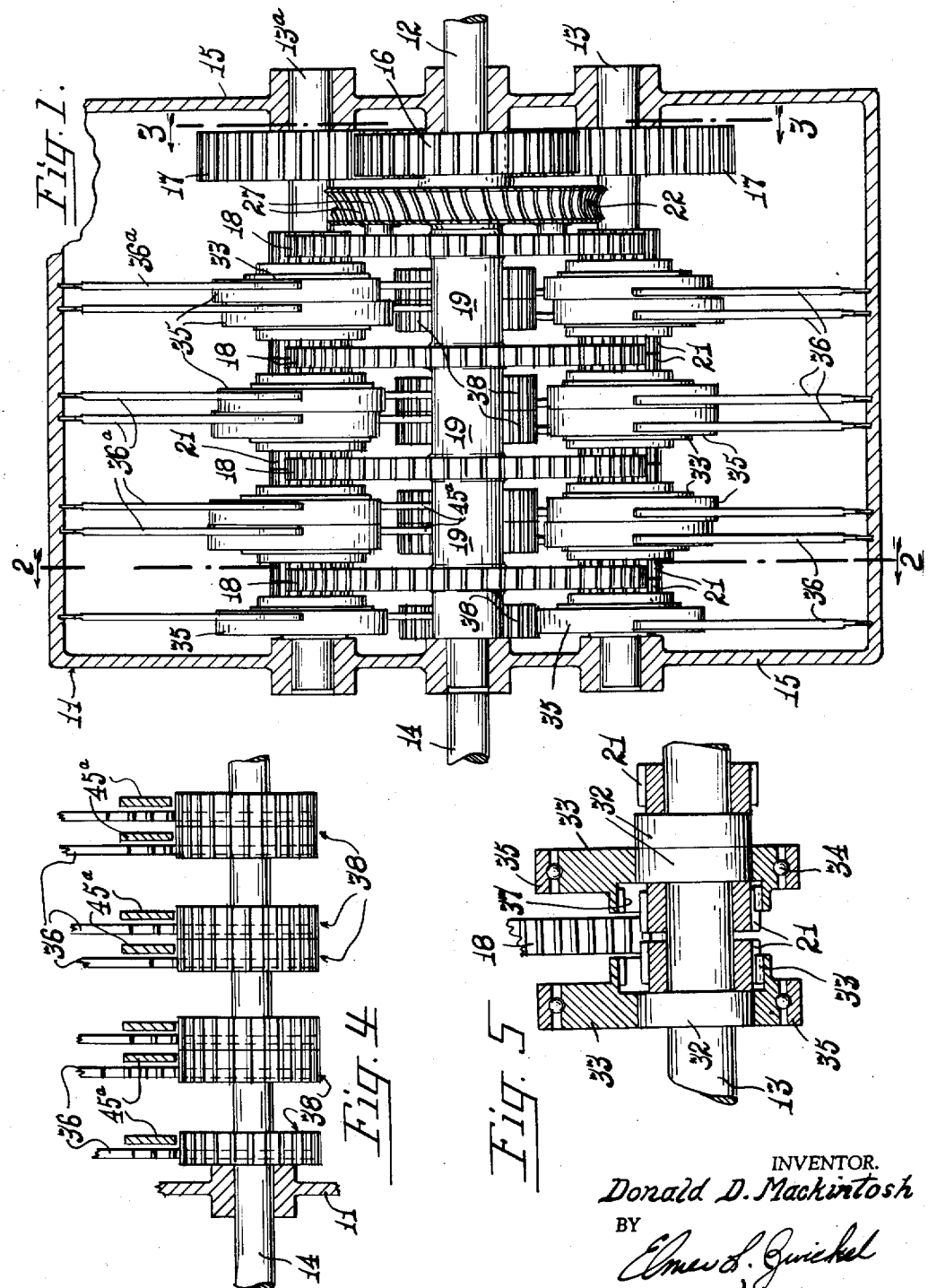

United States Patent Office 3,046,804
Patented July 31, 1962

3,046,804
POWER TRANSMISSION MECHANISM
Donald D. Mackintosh, R.R. 6, Box 122A, Crane, Ind.
Filed Aug. 24, 1959, Ser. No. 835,482
12 Claims. (Cl. 74—120)

The invention relates to improvements in easily controlled drive mechanism and is more particularly concerned with a power operated multiple planetary type transmission assembly useful for infinitely varying the speed of rotation of a power take-off shaft.

The transmission herein disclosed embodies selected features of the transmission device disclosed and claimed in my application Serial No. 406,112, filed January 26, 1954 which issued August 25, 1959, as Patent No. 2,900,839. The instant disclosure is concerned with the provision of a driven shaft having loosely mounted thereon a plurality of longitudinally spaced interconnected gears each meshed with one set of a plurality of eccentric drive gears. The eccentric drive gears of each set are mounted one on each of a pair of auxiliary shafts and each has associated therewith an eccentric, integral with the shaft and about which is arranged a circumferentially adjustable eccentric ring or sleeve.

The drive shaft is in direct drive connection with the auxiliary shafts and a planetary gear assembly operably connects the drive shaft with the interconnected gears so as to normally drive the eccentric drive gears at the same speed of rotation as the auxiliary shafts.

The mechanism also includes a power take-off shaft, the speed of rotation of which is to be incrementally controlled. To this end the power take-off shaft has a number of ratchet connected rack gears thereon, one for each of the aforementioned eccentric sleeves. Each of said gears has meshed with it a rack comprising part of a yoke that has an operating fit on a related eccentric sleeve. Because the eccentric sleeves are carried on two spaced apart shafts, the racks of the yokes cooperating with the eccentric sleeves on one shaft are extended in a direction approximately 90° from the direction of extension of the racks associated with the eccentric sleeves on the other auxiliary shaft. The foregoing arrangement can perhaps be best understood from a brief resume of the operation of the assembly.

When the drive shaft is being rotated, the auxiliary shafts and the eccentric sleeves thereon are rotated in unison. This imparts reciprocal motion to the yokes and their racks and because the eccentrics and eccentric sleeves are variously arranged circumferentially on their respective shafts, two or more of the racks operate at all times to rotate their related rack gears and drive the take-off shaft. In order to vary the speed of rotation of the take-off shaft, the planetary gear assembly is brought into play. Accordingly, by adjusting the relative position of the normally stationary ring gear of said assembly, the relative position circumferentially of the interconnected drive gears on the drive shaft is adjusted, thus adjusting the meshed eccentric drive gears and varying the relationship, circumferentially, of the eccentrics and the eccentric sleeves thereon to increase or decrease the length of travel of the yoke-racks driving the rack gears on the power take-off shaft.

It is therefore an object of the invention to provide a power drive mechanism of the character described and which has novel structural features and many advantages not present in known types of speed control devices.

Another object is to provide novel means to afford incremental adjustment of drive mechanism for a power take-off shaft.

Another object is to provide a mechanism of the character referred to which is capable of being adjusted, as to take-off speed of operation, while the mechanism is in operation.

Another object is to provide a novel controllable drive mechanism which is not expensive to manufacture and maintain serviceable, is easy to adjust, positive and extremely accurate in its adjustment, and which will remain adjusted.

The structure by means of which the above noted and other advantages of the invention are attained will be described in the following specification, taken in conjunction with the accompanying drawings, showing a preferred illustrative embodiment of the invention, in which;

FIG. 1 is a plan view of the assembly, showing the housing in section.

FIG. 2 is a transverse vertical sectional view taken on line 2—2 of FIG. 1.

FIG. 3 is a transverse vertical sectional view of the planetary assembly, taken on line 3—3 of FIG. 1.

FIG. 4 is a fragmentary detail sectional of several eccentric sleeve assemblies, view taken on line 4—4 of FIG. 2.

FIG. 5 is an enlarged fragmentary sectional view of the eccentric assembly taken substantially on line 5—5 of FIG. 2.

FIG. 6 is an enlarged detail view of one of the eccentric sleeve assemblies.

The accompanying drawings illustrate an exemplary embodiment of the novel speed control drive mechanism. This mechanism is constructed in a manner to permit fine incremental adjustment of the speed of rotation of the power takeoff shaft, within the maximum limit of the power input. The adjustment can be made while the mechanism is at rest or during operation. It comprises generally, a drive shaft having a drive connection through a gear train with a pair of auxiliary shafts each having eccentric assemblies thereon operable to impart reciprocal motion to yoke-racks which in turn are effective to rotate ratchet-pinions mounted firmly on the takeoff shaft. A planetary gear assembly and drive gears interconnect the drive shaft with eccentric drive gears loosely mounted on the auxiliary shafts, and is operable for rotating said eccentric drive gears independently of shaft rotation so as to adjust the eccentric assemblies in a manner to vary the length of reciprocal stroke of the yoke-racks and thereby increase or decrease the rate of rotation of the power take-off shaft.

Specifically, the assembly includes a housing 11 having a plurality of parallel shafts 12, 13, 13a and 14 journalled therein in its end walls 15. The shaft 12 is a rotatable drive shaft and it extends outwardly of one end of the housing to have a drive connection with any suitable power source. Shafts 13—13a are auxiliary shafts disposed below and one on each side of drive shaft 12. Shaft 14 is the power take-off or output shaft and it is located in longitudinal vertical alignment with drive shaft 12. The drive shaft 12 is connected directly to auxiliary shafts 13—13a by a gear train comprised of gear 16 on shaft 12 and gears 17, one on each shaft 13—13a, so as to impart uniform rotation to shafts 13—13a when drive shaft 12 is rotating.

A series of longitudinally spaced gears 18, interconnected rigidly by sleeves 19, are mounted for free rotation on drive shaft 12. These gears mesh at all times with respective gears 21 mounted for free rotation on the auxiliary shafts 13—13a.

Gears 18 are operably connected to drive shaft 12 through a planetary gear assembly generally indicated at 22 and best shown in FIG. 3. The planetary gear assembly includes one of the gears 18, in this instance the one at the right hand end of gear assembly as viewed in FIG. 1. As shown, end gear 18 has a plurality of planet pinions 23 mounted on its face which mesh at all times with a gear 24 secured to drive shaft 12 and with internal teeth 25 of a ring gear 26 having external teeth 27 on its outside peripheral surface. A worm 28 (FIG. 3) carried on a shaft 29 disposed perpendicular to shaft 12 and suitably journalled in housing 11, meshes with the external teeth 27 of the ring gear. Shaft 29 extends to the outside of housing 11 and carries a suitable handwheel 31 adapting it for rotation manually to adjust ring gear 26 circumferentially for a purpose to be explained presently. During operation of the mechanism, worm 28 prevents rotation of ring gear 26 whereby a direct drive between drive shaft 12 and gears 18 is maintained through gear 24 and planet pinions 23.

As noted hereinabove, auxiliary shafts 13 and 13a each mount the gears or pinions 21 for free rotation thereon and each is meshed at all times with a respective one of the interconnected gears 18 on shaft 12. In the present disclosure (FIG. 1) there are four gears 18, three of which mesh, one each, with a pair of pinions 21 on each shaft 13—13a and one (right hand end viewed in FIG. 1) which meshes with one of said pinions 21. Since the structure and operation of these gears and pinions and the eccentric assemblies associated with each and now to be described, are alike, the following description thereof will relate to but one assembly and like numerals will identify corresponding parts.

Referring now particularly to FIGS. 2, 5 and 6, pinion 21 is mounted closely adjacent to an eccentric 32 integral with shaft 13. Mounted snugly on eccentric 32 is an eccentric sleeve 33 suitably provided on its peripheral face with anti-friction means 34 supporting an anti-friction ring 35 which affords a bearing surface for a yoke 36 or 36a. The eccentrics 32 on shafts 13—13a are offset circumferentially relative to each other in the manner of crank-shaft construction.

The eccentric sleeve 33 has an internal gear 37 on one face thereof that is meshed at all times with the related pinion 21 so that rotation of pinion 21, through normal operation of the planetary drive and gears 18, causes the eccentric sleeve to rotate. The gear ratios of this gear drive train for rotation of eccentric sleeve 33 and the gear ratios of the gear train 16—17 driving shaft eccentric 32 are such that the shaft eccentric and the eccentric sleeve thereon are rotated at the same rate of speed consequently the relative circumferential positions of the eccentric and eccentric sleeve remain constant during normal operation. Since these eccentric sleeves constitute the motivating force for driving the power take-off shaft 14 through yokes 36 or 36a, the speed of rotation of said take-off shaft will remain constant until such time as it is changed in a manner now to be described.

In order to change the speed of rotation of the driven take-off shaft 14, the amount of reciprocation imparted to the yokes is varied. This is accomplished by changing the relative positions of eccentrics 32 and eccentric sleeves 33. This adjustment is effected manually by a manual rotation of worm 28 for rotating the normally stationary planetary ring gear 26 so as to rotate interconnected gears 18, with planet pinions 23, in one direction or the other. Adjusting rotation of gears 18 is transmitted through pinions 21 to the eccentric sleeves 33 through gear teeth 37 thereon thus rotating said eccentric sleeves 33 on their eccentrics 32 to thereby alter their relative eccentricity and increase or decrease the effective motion imparted to the yokes 36—36a constituting the drive means now to be described for rotating take-off shaft 14. Manual operation of worm 28 may be effected at any time without impairing or interfering with the operation of the drive mechanism. This arrangement permits very accurate adjustment of the eccentric sleeves and consequent minute adjustment in the rate of speed of take-off shaft rotation.

The drive means connecting the eccentric assemblies with the take-off shaft 14 is perhaps best illustrated in FIGS. 2 and 4. As shown, shaft 14 has a plurality of ratchet gears 38 thereon equal in number to the number of eccentric assemblies 32—33. These gears are structurally alike and each includes an annulus 39 having an internal circumferential face 41 and fitted over a flange 42 integral with shaft 14. The outside circumference of the flange 42 is formed with rack type teeth 43 between which friction elements 44 normally rest and which elements frictionally bind with annulus face 41 when the pinion is rotated in one direction so as to rotate the take-off shaft therewith. When rotated in the opposite or return direction the annulus turns free on the shaft.

The means for imparting such oscillatory rotation to the pinion or annulus 39 of the ratchet assembly 38 comprises yoke 36—36a fitted snugly over a complemental eccentric anti-friction ring 35. Each yoke includes a rack arm 45 or 45a that is meshed with the teeth on the respective annulus 39. During normal operation of shaft 13 and 13a, the related yoke 36 and 36a are reciprocated a distance determined by the relative position of the respective eccentric sleeve 33 on its eccentric 32, and in a direction to impart oscillatory rotation to the related ratchet-gear assembly 38. Since there are fourteen yokes and related eccentric assemblies shown in the instant disclosure there is imparted to the take-off shaft an uninterrupted driving force for rotating same at a uniform rate of speed. When the length of the stroke of the rack arms 45—45a is increased or decreased by manual adjustment of the eccentric sleeves 33, the speed of rotation of the take-off shaft is increased or decreased proportionately. The number of ratchet gear-rack and eccentric assemblies illustrated has been found to be adequate to insure smooth uninterrupted take-off shaft rotation and it should be apparent that more or less such drive assemblies and related gears 18—21 may be provided, such number being determined by the permissive tolerance the power take-off shaft can have insofar as harmonic movement is concerned.

Although I have described a preferred embodiment of my invention in considerable detail, it will be understood that the description thereof is intended to be illustrative, rather than restrictive, as many details of the structure shown may be modified or changed without departing from the spirit or scope of the invention. Accordingly, I do not desire to be restricted to the exact construction described.

I claim:

1. A power transmission mechanism including a drive shaft, a direct drive connection between the drive shaft and the auxiliary shafts, a plurality of integrally connected gears mounted for free rotation on said drive shaft, a gear mounted firmly on said drive shaft, planet pinions mounted on one of said plurality of gears and meshed with said firmly mounted gear, a normally stationary ring gear surrounding and meshed with the planet pinions, said firmly mounted gear, planet pinions and ring gear cooperating to rotate the plurality of gears when the drive shaft is rotated, pinions mounted for free rotation on the auxiliary shafts and meshed with selected gears of the integrally connected gears so as to be rotated when said gears are rotating, eccentrics fixed on the auxiliary shafts one adjacent to each pinion thereon, an eccentric sleeve fitted on each eccentric, an internal gear on each eccentric sleeve meshed with the respective pinion, the drive connections between the drive shaft and auxiliary shafts and between the drive shaft and the pinions being such that the pinions rotate the eccentric sleeves at the same rate of speed as the eccentrics during operation, pinions on the take-off shaft, a one way ratchet mechanism connecting said last named pinions to said take-off shaft, a yoke embracing each eccentric sleeve, a rack arm on each yoke each meshed with a pinion on the take-off shaft, said yokes and rack arms being reciprocated during eccentric sleeve rotation to oscillatably rotate the engaged pinions for rotating the take-off shaft in one direction, and means manually operable to rotate the ring gear for adjusting the relation of the eccentric sleeves to the eccentrics to vary the amount of yoke reciprocation.

2. A power transmission mechanism including a drive shaft, an auxiliary shaft and a power take-off shaft, a direct drive connection between the drive shaft and the auxiliary shaft, a plurality of integrally connected gears mounted for free rotation on said drive shaft, a gear mounted firmly on said drive shaft, planet pinions mounted on one of said plurality of gears and meshed with said firmly mounted gear, a normally stationary ring gear surrounding and meshed with the planet pinions, said firmly mounted gear, planet pinions and ring gear cooperating to rotate the plurality of gears when the drive shaft is rotated, pinions mounted for free rotation on the auxiliary shaft meshed with selected integrally connected gears so as to be rotated when said gears are rotating, eccentrics fixed on the auxiliary shaft one adjacent to each pinion thereon, an eccentric sleeve fitted on each eccentric, an internal gear on each eccentric sleeve meshed with the respective pinion, the drive connections between the drive shaft and auxiliary shafts and between the drive shaft and the pinions being such that the pinions rotate the eccentric sleeves at the same rate of speed as the eccentrics during operation, pinions on the take-off shaft, a one way ratchet mechanism connecting said last named pinions to said take off shaft, a yoke embracing each eccentric sleeve, a rack arm on each yoke each meshed with a pinion on the take-off shaft, said yokes and rack arms being reciprocated during operation to oscillatably rotate the engaged pinions for rotating the take off shaft in one direction, and means for adjusting the relation of the eccentric sleeves to the eccentrics to vary the amount of yoke reciprocation.

3. A power transmission mechanism including a drive shaft, auxiliary shafts and a power take-off shaft, a direct drive connection between the drive shaft and the auxiliary shafts, a plurality of integrally connected gears mounted for free rotation on said drive shaft, a gear mounted firmly on said drive shaft, planet pinions mounted on one of said plurality of gears and meshed with said firmly mounted gear, a normally stationary ring gear surrounding and meshed with the planet pinions, said firmly mounted gear, planet pinions and ring gear cooperating to rotate the plurality of gears when the drive shaft is rotated, pinions mounted for free rotation on the auxiliary shafts and meshed with selected gears of the integrally connected gears so as to be rotated when said gears are rotating, eccentrics fixed on the auxiliary shafts one adjacent to each pinion thereon, an eccentric sleeve fitted on each eccentric, an internal gear on each eccentric sleeve meshed with the respective pinion, the drive connections between the drive shaft and auxiliary shafts and between the drive shaft and the pinions being such that the pinions rotate the eccentric sleeves at the same rate of speed as the eccentrics during operation, pinions on the take off shaft, a one way ratchet mechanism connecting said last named pinions to said take-off shaft, a yoke embracing each eccentric sleeve and a rack arm on each yoke each meshed with a pinion on the take off shaft, said yokes and rack arms being reciprocated during operation to oscillatably rotate the engaged pinions for rotating the take off shaft in one direction.

4. A power transmission mechanism including a drive shaft, an auxiliary shaft and a power take-off shaft, a direct drive connection between the drive shaft and the auxiliary shaft, a first gear mounted for free rotation on said drive shaft, a second gear mounted firmly on said drive shaft, planet pinions mounted on said first gear and meshed with said second gear, a normally stationary ring gear surrounding and meshed with the planet pinions, said second gear, planet pinions and ring gear cooperating to rotate the first gear when the drive shaft is rotated, a pinion mounted for free rotation on the auxiliary shaft and meshed with the first gear so as to be rotated when said gear is rotating, an eccentric fixed on the auxiliary shaft adjacent to the pinion thereon, an eccentric sleeve fitted on said eccentric, an internal gear on the eccentric ring meshed with the pinion, pinions on the take-off shaft, a one way ratchet mechanism connecting said last named pinions to said take-off shaft, a yoke embracing the eccentric sleeve, a rack on the yoke meshed with the pinion on the take-off shaft, said rack being reciprocated during operation to oscillatably rotate the engaged pinion and rotate the take-off shaft in one direction, and means manually operable to rotate the ring gear for adjusting the relation of the eccentric sleeve to the eccentric to vary the amount of yoke reciprocation.

5. A power transmission mechanism including a drive shaft, auxiliary shafts and a power take-off shaft, a direct drive connection between the drive shaft and the auxiliary shafts, a plurality of first gears mounted for free rotation on said drive shaft, a second gear mounted firmly on said drive shaft, planet pinions mounted on one of said plurality of gears and meshed with said second gear, a normally stationary ring gear surrounding and meshed with the planet pinions, said second gear, planet pinions and ring gear cooperating to rotate the plurality of gears when the drive shaft is rotated, pinions mounted for free rotation on the auxiliary shafts and meshed with the plurality of gears so as to be rotated when said gears are rotating, eccentrics fixed on the auxiliary shafts, an eccentric sleeve fitted on each eccentric, an internal gear on each eccentric sleeve meshed with a respective pinion, a one way ratchet mechanism connecting said last named pinions to said take-off shaft, means operable by each eccentric sleeve to oscillatably rotate the pinions for rotating the take-off shaft in one direction, and means manually operable to rotate the ring gear for adjusting the relation of the eccentric sleeves to the eccentrics to vary the effective thrust of said sleeves.

6. A power transmission mechanism including a drive shaft and a power take-off shaft, at least one auxiliary shaft, a direct drive connection between said drive and auxiliary shaft, at least one gear mounted for free rotation on said drive shaft, a planetary gear connection between the drive shaft and said gear for rotating the latter, a pinion on the auxiliary shaft, an eccentric sleeve fitted on the eccentric, an internal gear on said eccentric sleeve meshed with the pinion, the drive connections between the drive shaft and the auxiliary shaft and between the drive shaft and the pinion being such that the pinion rotates the eccentric sleeves at the same rate of speed as the auxiliary shaft during operation, means operable manually to rotate the gear independently of its drive so as to impart circumferential rotation to the eccentric sleeve relative to the eccentric, a ratchet connected pinion on the take-off shaft, and a rack operably connected to the eccentric and meshed with said pinion adapted to reciprocate during eccentric rotation to impart rotation to said take-off shaft in one direction.

7. A power transmission mechanism including a drive shaft and a power take-off shaft, at a pair of auxiliary shafts, a direct drive connection between said drive and auxiliary shafts, a plruality of gears mounted for free rotation on said drive shaft, a planetary gear connection between the drive shaft and said gears for rotating the latter, pinions on the auxiliary shafts meshed with selected of said gears, eccentrics fixed on the auxiliary shafts, an eccentric sleeve fitted on each ececntric, an internal gear on said eccentric sleeve meshed with the respective pinion, the drive connections between the drive shaft and the auxiliary shafts and between the drive shaft and the pinions being such that the pinions rotate the eccentric sleeves at the same rate of speed as the auxiliary shaft during normal operation, and means operable to rotate the gears independently of their drive so as to impart circumferential rotation to the eccentric sleeves relative to the eccentrics, and means actuated by the eccentric sleeves for rotaitng the power take-off shaft.

8. A power transmission mechanism including a drive shaft and a power take off shaft, at least one auxiliary shaft, a direct drive connection between said drive and auxiliary shaft, at least one gear mounted for free rotation on said drive shaft, a planetary gear connection between the drive shaft and said gear for rotating the latter, a pinion on the auxiliary shaft meshed with said gear, an eccentric fixed on the auxiliary shaft, an eccentric sleeve fitted on the eccentric, an internal gear on said eccentric sleeve meshed with the pinion, the drive connections between the drive shaft and the auxiliary shaft and between the drive shaft and the pinion being such that the pinion rotates the eccentric sleeves at the same rate of speed as the auxiliary shaft during operation, and means operable manually to rotate the gear independently of its drive so as to impart circumferential rotation to the eccentric ring relative to the eccentric, and means actuated by the eccentric sleeve for rotating the power take-off shaft.

9. A power transmission mechanism including a drive shaft and a power take-off shaft, at least one auxiliary shaft, a direct drive connection between said drive and auxiliary shaft, at least one gear mounted for free rotation on said drive shaft, a planetary gear connection between the drive shaft and said gear for rotating the latter, a pinion on the auxiliary shaft meshed with said gear, an eccentric fixed on the auxiliary shaft, an eccentric sleeve fitted on the eccentric, an internal gear on said eccentric sleeve meshed with the opinion, the drive connections between the drive shaft and the auxiliary shaft and between the drive shaft and the pinion being such that the pinion rotates the eccentric sleeves at the same rate of speed as the auxiliary shaft during operation, and means operable manually to rotate the gear independently of its drive so as to impart circumferential rotation to the eccentric sleeve relative to the eccentric.

10. A drive mechanism including a pair of auxiliary shafts each having eccentrics each mounting an eccentric sleeve, a drive shaft geared to each of said auxiliary shafts for rotating same, pinions mounted for free rotation on each auxiliary shaft one having an operable connection with each eccentric sleeve, gears mounted for free rotation on said drive shaft and meshed with said pinions, a planetary gear assembly connecting the drive shaft with said gears for driving the gears and rotating the pinions at the same rate of rotation as the auxiliary shafts on which they are mounted, means operable by the eccentric sleeves to rotate a power take-off shaft, and means to rotate the gears independently of the planetary drive to rotate the pinions and adjust the eccentric sleeves circumferentially relative to the eccentrics, so as to vary the speed of rotation of the take-off shaft.

11. A drive mechanism including an auxiliary shaft having eccentrics each mounting an eccentric sleeve, a drive shaft geared to said auxiliary shaft for rotating same, pinions mounted for free rotation on said auxiliary shaft one having an operable connection with each eccentric sleeve, gears mounted for free rotation on said drive shaft and meshed with said pinions, a planetary gear train connecting the drive shaft with said gears for driving the gears and rotating the pinions at the same rate of rotation as the auxiliary shaft, reciprocal means operable by the eccentric sleeves to rotate a power take-off shaft, and means to adjust the eccentric sleeves circumferentially relative to the eccentrics so as to vary the stroke of the reciprocal means and alter the speed of rotation of the take-off shaft.

12. A drive mechanism including a pair of auxiliary shafts each having eccentrics each mounting an eccentric sleeve, a drive shaft geared to each of said auxiliary shafts for rotating same, pinions mounted for free rotation on each auxiliary shaft one having an operable connection with each eccentric sleeve, gears mounted for free rotation on said drive shaft and meshed with said pinions, a planetary gear assembly connecting the drive shaft with said gears for driving the gears and rotating the pinions at the same rate of rotation as the auxiliary shafts on which they are mounted, means operable by the eccentric sleeves to impart rotation to a power take-off shaft, and means to adjust the eccentric sleeves circumferentially relative to the eccentrics so as to vary the speed of rotation of the take-off shaft.

References Cited in the file of this patent

UNITED STATES PATENTS

| | | |
|---|---|---|
| 1,135,990 | Bronander | Apr. 20, 1915 |
| 1,437,120 | Stephenson | Nov. 28, 1922 |

FOREIGN PATENTS

| | | |
|---|---|---|
| 20,707 | Austria | July 25, 1905 |